United States Patent
Horikawa et al.

(10) Patent No.: US 9,288,693 B2
(45) Date of Patent: Mar. 15, 2016

(54) WIRELESS COMMUNICATION DEVICE AND WIRELESS COMMUNICATION METHOD

(71) Applicants: Seiichiro Horikawa, Yokohama (JP); Koji Akita, Yokohama (JP)

(72) Inventors: Seiichiro Horikawa, Yokohama (JP); Koji Akita, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 214 days.

(21) Appl. No.: 13/676,756

(22) Filed: Nov. 14, 2012

(65) Prior Publication Data

US 2013/0210344 A1    Aug. 15, 2013

(30) Foreign Application Priority Data

Feb. 9, 2012    (JP) .................................. 2012-26125

(51) Int. Cl.
*H04B 5/00* (2006.01)
*H04W 36/14* (2009.01)
*H04W 36/26* (2009.01)
*H04W 24/04* (2009.01)

(52) U.S. Cl.
CPC ............. *H04W 24/04* (2013.01); *H04B 5/0031* (2013.01); *H04W 36/14* (2013.01); *H04W 36/26* (2013.01)

(58) Field of Classification Search
None
See application file for complete search history.

(56) References Cited

U.S. PATENT DOCUMENTS

| | | | |
|---|---|---|---|
| 2007/0049276 A1* | 3/2007 | Rimoni et al. | 455/436 |
| 2010/0144273 A1 | 6/2010 | Sekikawa et al. | |
| 2010/0246534 A1* | 9/2010 | Vargantwar et al. | 370/332 |
| 2010/0284370 A1* | 11/2010 | Samar et al. | 370/331 |
| 2012/0300622 A1* | 11/2012 | Kruglick | 370/230 |

FOREIGN PATENT DOCUMENTS

JP    2010-136216 A    6/2010

OTHER PUBLICATIONS

Japanese Office Action dated Jun. 3, 2014 in counterpart Japanese Application No. 2012-026125.

* cited by examiner

*Primary Examiner* — Ping Hsieh
*Assistant Examiner* — James Yang
(74) *Attorney, Agent, or Firm* — Holtz, Holtz & Volek PC (57) ABSTRACT

A wireless communication device has a first wireless unit, a second wireless unit, a storage, a communication judging unit, a threshold value retaining unit configured to retain a threshold value used to judge whether or not to permit a switch from the first wireless unit to the second wireless unit, a remaining volume monitoring unit configured to judge, when the communication judging unit judges that the first wireless unit has disconnected communication, whether volume of remaining unreceived data to be incorporated into the data received by the first wireless unit before the disconnection of communication is smaller than the threshold value retained by the threshold value retaining unit, and a controller configured to start receiving the unreceived data by switching from the first wireless unit to the second wireless unit, when the volume of remaining unreceived data is judged to be small by the remaining volume monitoring unit.

18 Claims, 9 Drawing Sheets

WIRELESS COMMUNICATION DEVICE AND WIRELESS COMMUNICATION METHOD

CROSS REFERENCE TO RELATED APPLICATIONS

This application is based upon and claims the benefit of priority from the prior Japanese Patent Application No. 2012-26125, filed on Feb. 9, 2012, the entire contents of which are incorporated herein by reference.

FIELD

Embodiments of the present invention relate to a wireless communication device and a wireless communication method capable of performing wireless communication by switching a plurality of wireless units.

BACKGROUND

A technique has been proposed in which two wireless units different from each other in communication distance and communication speed are switched depending on communication situation in order to perform wireless communication.

However, since the conventional technique does not consider the influence on the network of the wireless unit selected through the switch, there is a likelihood that network traffic is excessively increased and system break-down is caused in the worst case scenario. Particularly, when the network of the wireless unit is a public network, an enormous amount of negative influence is exerted on a large indefinite number of wireless devices. Accordingly, the wireless units should be switched carefully.

DETAILED DESCRIPTION

One embodiment of wireless communication device includes a first wireless unit (i.e., module); a second wireless unit (i.e., module) configured to cover a longer communication distance than the first wireless unit; a storage configured to store data received by the first wireless unit or by the second wireless unit; a communication judging unit (i.e., module) configured to judge whether the first wireless unit is currently continuing communication, or has disconnected communication; a threshold value retaining unit (i.e., module) configured to retain a threshold value used to judge whether or not to permit a switch from the first wireless unit to the second wireless unit; a remaining volume monitoring unit (i.e., module) configured to judge, when the communication judging unit judges that the first wireless unit has disconnected communication, whether volume of remaining unreceived data to be incorporated into the data received by the first wireless unit before the disconnection of communication is smaller than the threshold value retained by the threshold value retaining unit; and a controller configured to start receiving the unreceived data by switching from the first wireless unit to the second wireless unit, when the volume of remaining unreceived data is judged to be small by the remaining volume monitoring unit.

Figure 1:
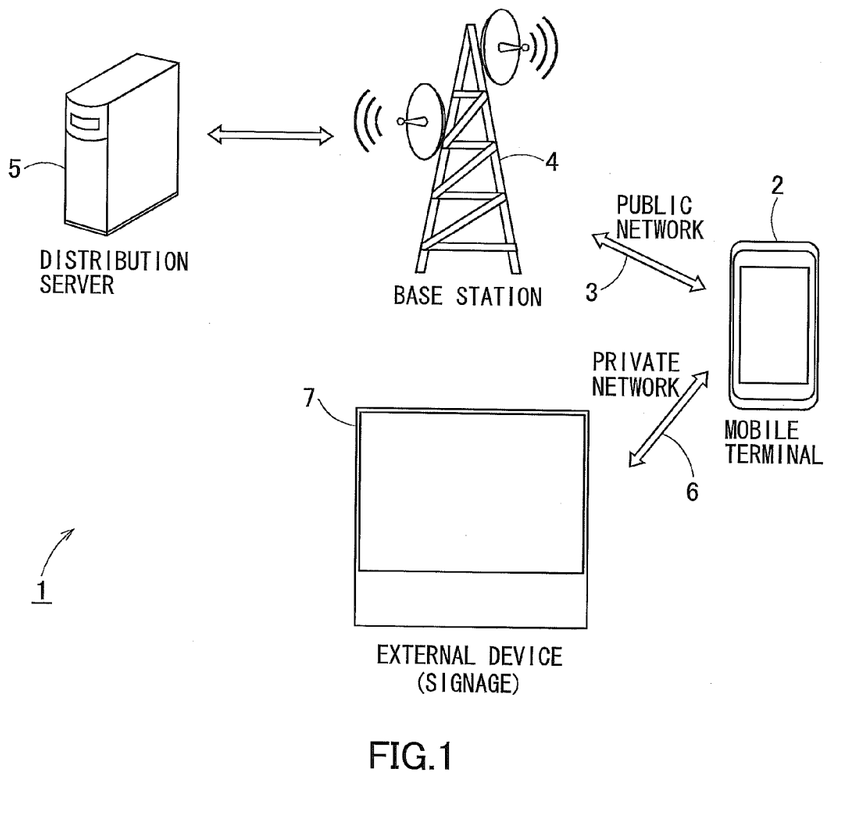
FIG. 1 is a diagram showing a schematic structure of a wireless communication system 1 having a wireless communication device according to the present embodiments.

Embodiments will now be explained with reference to the accompanying drawings. FIG. 1 is a diagram showing a schematic structure of a wireless communication system 1 having a wireless communication device according to the present embodiments. A wireless communication device according to the present embodiments is a mobile terminal, for example. The wireless communication system 1 of FIG. 1 has a mobile terminal 2 according to the present embodiments, a base station 4 wirelessly communicating with the mobile terminal 2 through a public network 3, a distribution server 5 connected to the base station 4 directly or through a network, and an external device 7 wirelessly communicating with the mobile terminal 2 through a private network 6.

The mobile terminal 2 according to the present embodiments is, e.g., a cellular phone, smartphone, tablet, mobile PC, portable game machine, etc. The mobile terminal 2 has a near-field high-speed wireless communication unit. The wireless communication system 1 of FIG. 1 provides a service for downloading large-volume data from the external device 7 to the mobile terminal 2 using the near-field high-speed wireless communication unit.

As the near-field high-speed wireless communication, it is assumed to use the private network 6 capable of performing higher-speed communication and covering a shorter communication distance than the existing public network 3 such as 3G, WiMAX, LTE, public wireless LAN, etc. For example, TransferJet can be used for the near-field high-speed wireless communication.

The external device 7 is, e.g., a digital signage providing advertising information depending on a request from the mobile terminal 2 through the private network 6 performing near-field high-speed wireless communication. Note that the external device 7 should not be limited to the digital signage, and the concrete configuration of the external device 7 is not questioned as long as the external device 7 is a communication device providing a download service through the near-field high-speed wireless communication. For example, the external device 7 may be an automatic ticket gate used in a station.

The user of the mobile terminal 2 starts downloading large-volume data by approaching the external device 7 close enough to perform near-field high-speed wireless communication with the external device 7. A problem at this time concerns a backup process to be performed when the communication is disconnected in the middle of downloading the data. In the backup process according to the present embodiments, when near-field high-speed wireless communication is disconnected in the middle of download, the wireless system of the mobile terminal 2 is switched from the private network 6 to the public network 3, which makes it possible to keep downloading the data from the base station 4 utilizing the public network 3.

However, there is a fear that the traffic of the public network 3 is excessively increased when trying to download large-volume data through the public network 3, which is because the download speed of the public network 3 is slower than the download speed of the private network 6 providing near-field high-speed wireless communication. Accordingly, the embodiments explained below are characterized in that large-volume data can be downloaded using the public network 3, without excessively increasing the traffic of the public network 3.

First Embodiment

Figure 2:
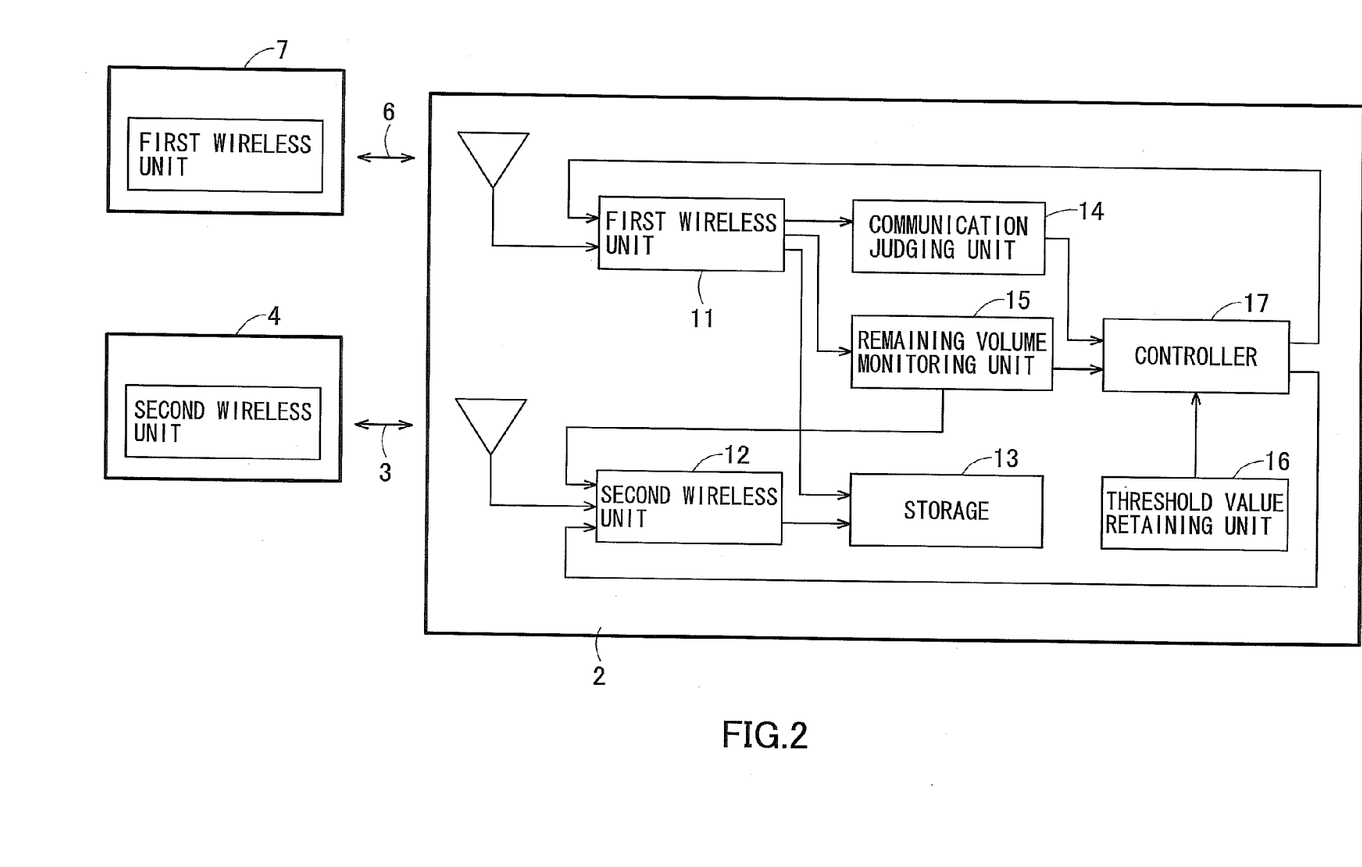
FIG. 2 is a block diagram showing the internal structure of a mobile terminal 2 according to a first embodiment.

FIG. 2 is a block diagram showing the internal structure of the mobile terminal 2 according to a first embodiment. The mobile terminal 2 of FIG. 2 has a first wireless unit 11, a second wireless unit 12, a storage 13, a communication judging unit 14, a remaining volume monitoring unit 15, a threshold value retaining unit 16, and a controller 17.

The first wireless unit (i.e., module) 11 is characterized in covering a short communication distance, and performs near-field high-speed wireless communication using the private network 6, for example. The second wireless unit (i.e., module) 12 is characterized in covering a longer communication distance than the first wireless unit 11, and performs wireless communication using the public network 3, for example. The storage 13 stores data received by the first wireless unit 11 and the second wireless unit 12.

The communication judging unit (i.e., module) 14 judges whether the first wireless unit 11 is currently continuing communication, or has disconnected communication. The threshold value retaining unit (i.e., module) 16 retains a threshold value used to judge whether or not to permit a switch from the first wireless unit 11 to the second wireless unit 12. The remaining volume monitoring unit (i.e., module) 15 judges, when the communication judging unit 14 judges that the first wireless unit 11 has disconnected communication, whether volume of remaining unreceived data is smaller than the threshold value retained by the threshold value retaining unit 16. When the volume of remaining unreceived data is judged to be small by the remaining volume monitoring unit 15, the controller 17 starts receiving the unreceived data by switching from the first wireless unit 11 to the second wireless unit 12.

Figure 3:
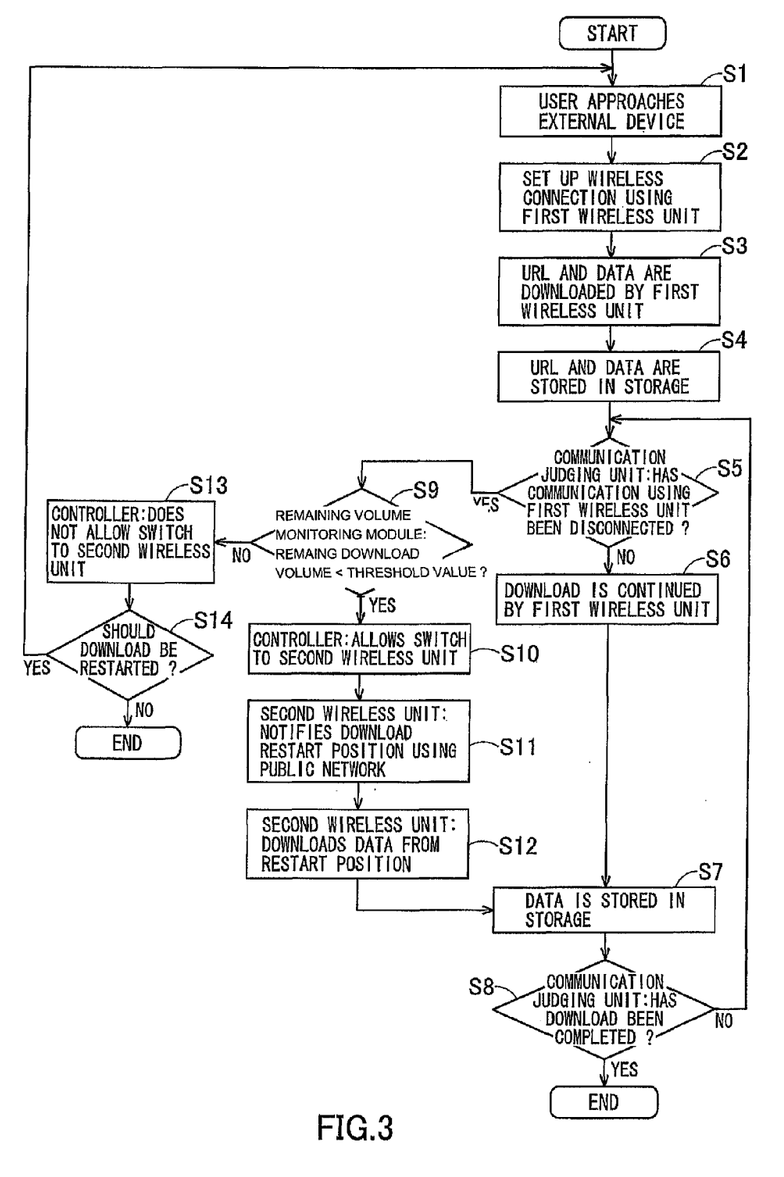
FIG. 3 is a flow chart showing the processing operation performed by the mobile terminal 2 of FIG. 2.

FIG. 3 is a flow chart showing the processing operation performed by the mobile terminal 2 of FIG. 2. Hereinafter, the processing operation performed by the mobile terminal 2 of FIG. 2 will be explained using FIG. 3.

When the user of the mobile terminal 2 wants to download large-volume data using a service provided by the external device 7, the user approaches close to the external device 7 (Step S1), and establishes communication between the first wireless unit 11 and the external device 7 within the wireless communication range of the external device 7, by receiving radio waves from the external device 7 using the first wireless unit 11 in the mobile terminal 2 (Step S2).

When communication has been established, data is started to be downloaded from the external device 7 using the first wireless unit 11 (Step S3). At this time, URL information of the distribution server 5 is also downloaded from the external device 7 considering the case of switching to the second wireless unit 12 later.

When the mobile terminal 2 has a third wireless unit which performs communication at lower speed than the second wireless unit 12, the communication at Step S2 may be established using this third wireless unit, and when communication has been established, the third wireless unit is switched to the first wireless unit 11 to download data at high speed by the first wireless unit 11. For example, NFC may be utilized for the third wireless unit.

The data and URL information downloaded from the external device 7 using the first wireless unit 11 are stored in the storage 13 (Step S4).

The communication judging unit 14 judges whether the wireless communication between the external device 7 and the first wireless unit 11 has been disconnected in the middle of download (Step S5). If not having been disconnected, download is continued (Step S6), and the downloaded data and URL information are stored in the storage 13 (Step S7). Next, whether the data has been completely downloaded is judged (Step S8). If the data has not been completely downloaded, Step S5 and subsequent steps are repeated, while if the data has been completely downloaded, this process is terminated.

On the other hand, when it is judged that communication has been disconnected at Step S5, whether the volume of remaining data to be downloaded is smaller than a predetermined threshold value is judged (Step S9). When the remaining volume is smaller than the threshold value, a switch to the second wireless unit 12 is permitted (Step S10), and the permission is notified to the first wireless unit 11 and the second wireless unit 12 to switch the wireless systems. Next, the second wireless unit 12 (or a notifier module therein) is used to notify the download restart position of the data to the base station 4 connected to the public network 3 (Step S11). Then, the base station 4 starts transmitting data from the notified download restart position. The mobile terminal 2 starts downloading the data transmitted from the base station 4 through the public network 3 using the second wireless unit 12 (Step S12), and performs Step S7 and subsequent steps.

On the other hand, when the remaining volume is judged to be equal to or greater than the threshold value at Step S9, a switch to the second wireless unit 12 is not permitted (Step S13). Next, whether download from the external device 7 should be restarted is judged using the first wireless unit 11 which has been disconnected (Step S14). If restarting download, Step S1 and subsequent steps are repeated, while if not restarting download, the process of FIG. 3 is terminated.

At Step S14, it is judged whether the mobile terminal 2 is located within a range where it can wirelessly communicate with the external device 7 using the first wireless unit 11. If the mobile terminal 2 is located beyond the range where wireless communication is available, moving direction and distance to the range may be displayed on a display of the mobile terminal 2. When the user of the mobile terminal 2 looks at this display and moves to enter the range where the external device 7 and the first wireless unit 11 can wirelessly communicate with each other, information showing that download is made available is displayed on the display, and Step S2 and subsequent steps as stated above are performed.

Such a display control on the display may be performed by the controller 17, or by a display controller (movement instructing unit or module) arranged separately from the controller 17.

As stated above, in the first embodiment, if communication with the external device 7 is disconnected while data is being downloaded from the external device 7 through the private network 6 using the first wireless unit 11, only when remaining download volume is smaller than the threshold value, download from the base station 4 is restarted through the public network 3 at low speed using the second wireless unit 12. Accordingly, download can be continued without excessively increasing the traffic of the public network 3. Therefore, according to the first embodiment, even when communication is disconnected in the middle of download, there is no need to newly download the data from the beginning thereof, which makes it possible to shorten the time required for download while reducing network traffic.

Second Embodiment

A second embodiment explained below is characterized in acquiring, from the external device 7, a threshold value to be compared to the remaining download volume.

Figure 4:
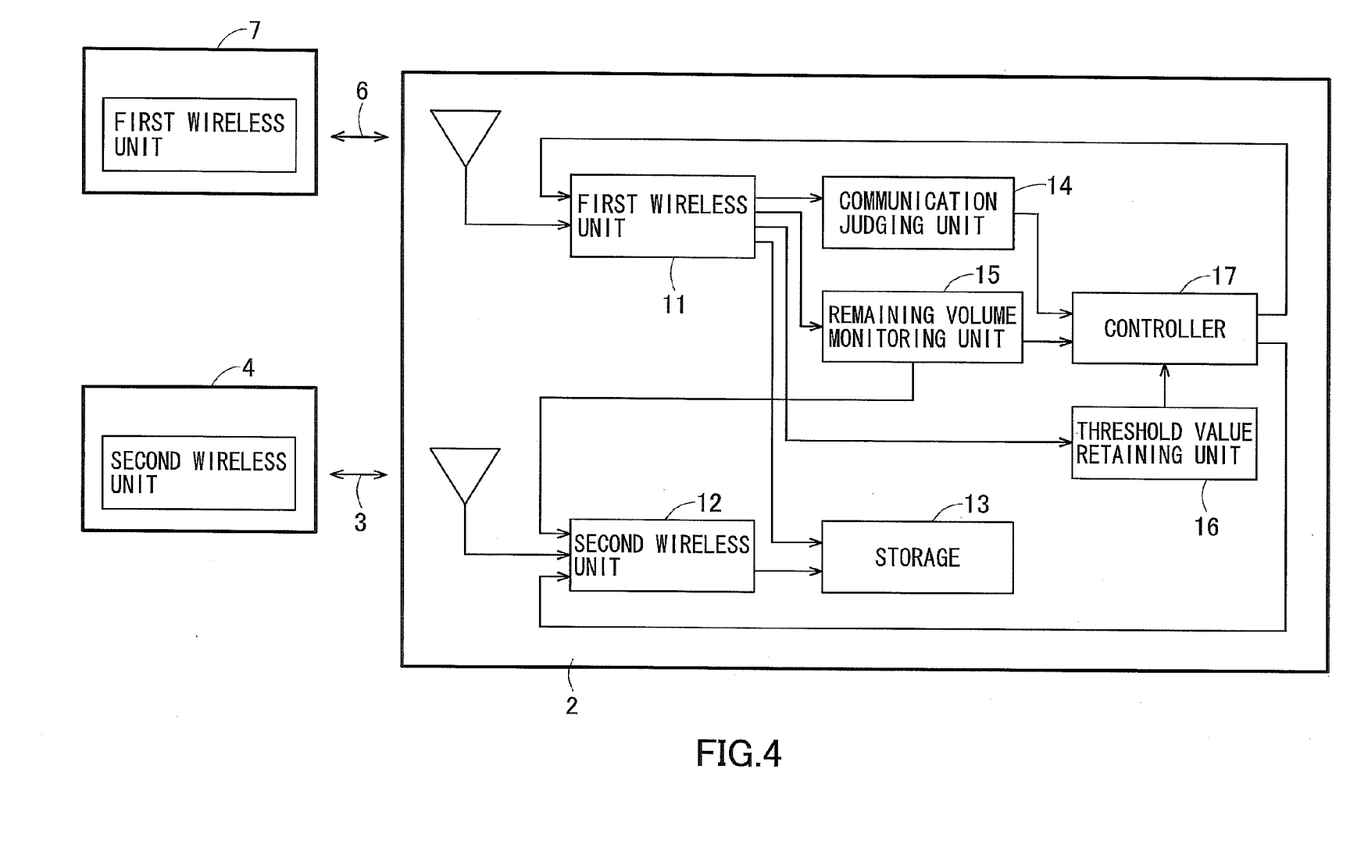
FIG. 4 is a block diagram showing the internal structure of the mobile terminal 2 according to a second embodiment.

FIG. 4 is a block diagram showing the internal structure of the mobile terminal 2 according to the second embodiment. The mobile terminal 2 of FIG. 4 is different from that of FIG. 2 in that a threshold value is received from the external device 7 by the first wireless unit 11 through the private network 6, and then retained by the threshold value retaining unit 16. The other features are the same as FIG. 2.

Figure 5:
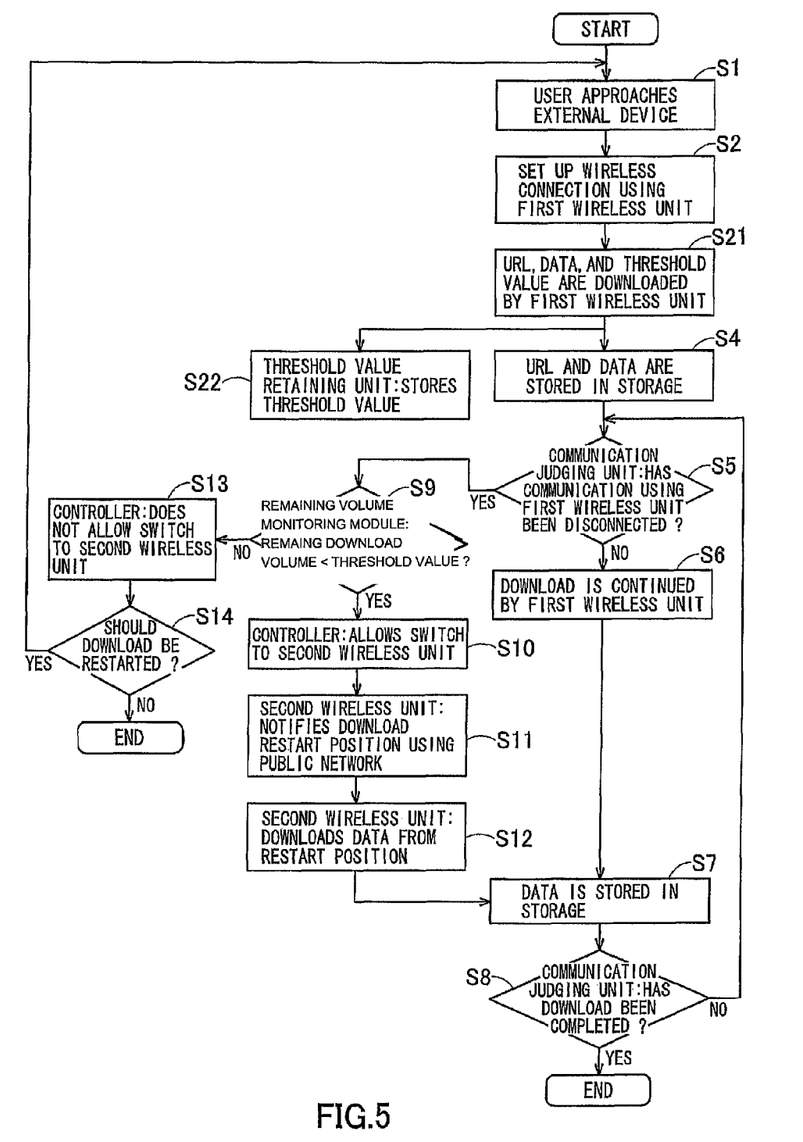
FIG. 5 is a flow chart showing the processing operation performed by the mobile terminal 2 of FIG. 4.

FIG. 5 is a flow chart showing the processing operation performed by the mobile terminal 2 of FIG. 4. In FIG. 5, the same processing steps as those in FIG. 3 are given the same symbols. Steps S21 and S22 in FIG. 5 are provided instead of Step S3 in FIG. 3. When communication between the external device 7 and the mobile terminal 2 is established using the first wireless unit 11 at Step S2, data and URL information are received from the external device 7 together with a threshold value, using the first wireless unit 11 (Step S21). The received data and URL information are stored in the storage 13 (Step S4), and the received threshold value is retained by the threshold value retaining unit 16 (Step S22). The threshold value retained by the threshold value retaining unit 16 is used to be compared to the remaining download volume at Step S9.

The external device 7 may change the threshold value depending on the type of data to be downloaded. For example, as to data which is greatly promoted to be distributed by a data distributor, the threshold value may be set larger than a normal value. There is a strong possibility that as the threshold value becomes larger, the traffic of the public network 3 is excessively increased due to the increase in the frequency of utilizing the public network 3. On the other hand, it is possible to distribute the data to a larger number of people since there is a high possibility that the data is completely downloaded. Further, the threshold value may be changed considering the importance, distribution time, etc. of the data, as a data type.

Furthermore, the external device 7 may change the threshold value depending on the traffic of the public network 3. For example, by previously checking hours during which traffic is heavy, a smaller threshold value may be set for the heavy traffic hours in order to reduce the frequency of utilizing the public network 3, while a larger threshold value may be set for the hours during which traffic is not heavy.

Still further, the external device 7 may change the threshold value depending on the wireless system of the second wireless unit 12. That is, a smaller threshold value may be set for a wireless system easily causing heavy traffic in order to reduce the frequency of utilizing the public network 3, while a larger threshold value may be set for a wireless system hardly causing heavy traffic in order to increase the frequency of utilizing the public network 3.

As stated above, in the second embodiment, the same effect as the first embodiment can be obtained, and further it is possible to variably adjust the threshold value in consideration of size and type of data to be downloaded, network load, etc. by setting the threshold value using the external device 7, thereby avoiding heavy traffic on the public network 3.

Third Embodiment

A third embodiment explained below is characterized in acquiring, from the base station 4, a threshold value to be compared to the remaining download volume.

Figure 6:
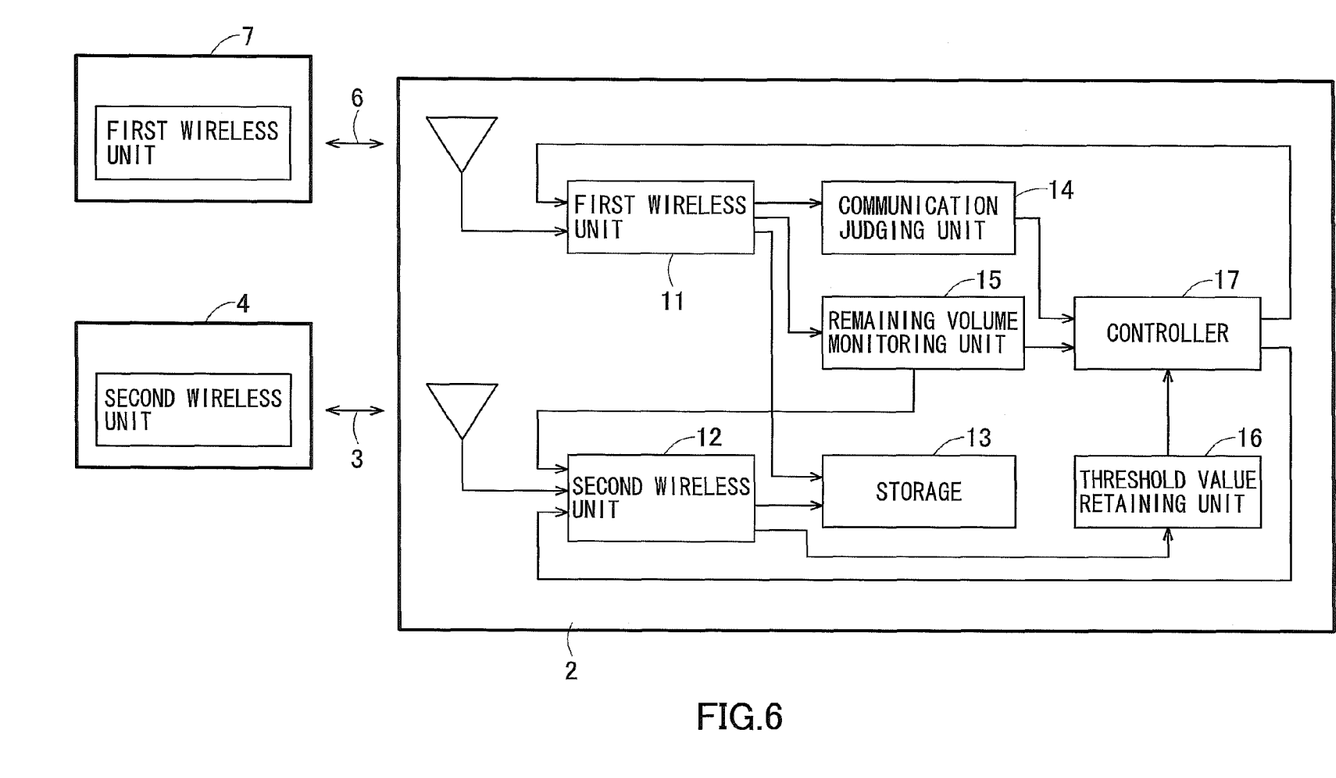
FIG. 6 is a block diagram showing the internal structure of the mobile terminal 2 according to a third embodiment.

FIG. 6 is a block diagram showing the internal structure of the mobile terminal 2 according to the third embodiment. The mobile terminal 2 of FIG. 6 is different from that of FIG. 2 in that a threshold value is received from the base station 4 by the second wireless unit 12 through the public network 3, and then retained by the threshold value retaining unit 16. The other features are the same as FIG. 2.

Figure 7:
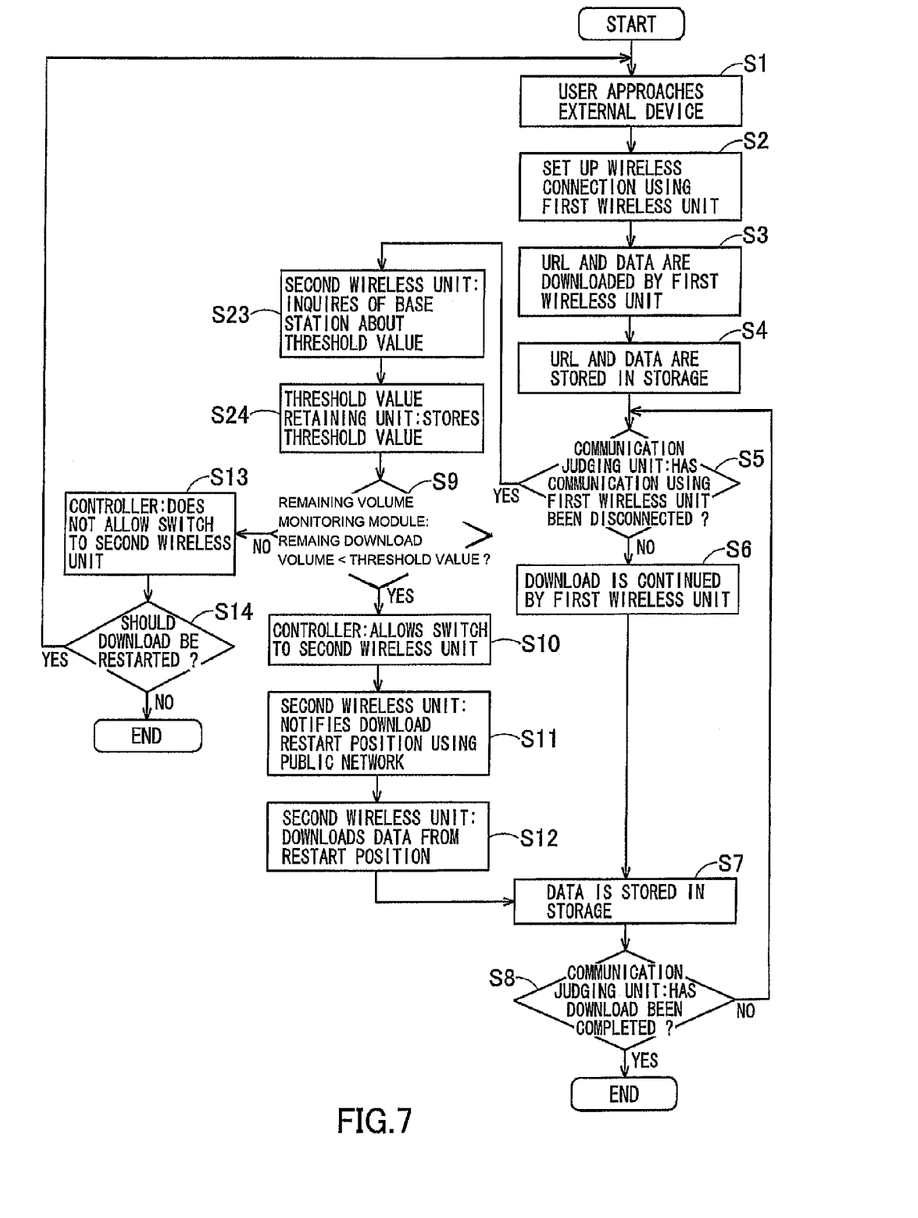
FIG. 7 is a flow chart showing the processing operation performed by the mobile terminal 2 of FIG. 6.

FIG. 7 is a flow chart showing the processing operation performed by the mobile terminal 2 of FIG. 6. In FIG. 7, the same processing steps as those in FIG. 3 are given the same symbols. In FIG. 7, when communication between the first wireless unit 11 of the mobile terminal 2 and the external device 7 is disconnected at Step S5, the second wireless unit 12 inquires of the base station 4 about a threshold value through the public network 3 (Step S23). When a threshold value is transmitted from the base station 4 responding to this inquiry, the threshold value is received by the second wireless unit 12 and retained by the threshold value retaining unit 16 (Step S24). After that, Step S9 and subsequent steps are performed.

Similarly to the second embodiment, the threshold value set by the base station 4 may be different depending on the data to be downloaded. For example, as to data that a data distributor promotes distribution, the threshold value may be set larger than a normal value. Further, the threshold value may be changed considering the importance and distribution time of the data.

Furthermore, the base station 4 may change the threshold value depending on the traffic of the public network 3 connected to the base station 4. For example, a larger threshold value may be set when traffic is light at the time point of receiving an inquiry about the threshold value so that the frequency of utilizing the public network 3 is increased, while a smaller threshold value may be set when traffic is excessively increased at the time point of receiving the inquiry so that the frequency of utilizing the public network 3 is reduced.

Still further, similarly to the second embodiment, the base station 4 may change the threshold value depending on the wireless system of the second wireless unit 12.

As stated above, in the third embodiment, since the threshold value is set by the base station 4 connected to the public network 3, the threshold value can be optimized depending on the type of data to be downloaded and how much the traffic of the public network 3 is increased, which makes it possible to sensitively control the traffic of the public network 3.

Fourth Embodiment

A fourth embodiment explained below is characterized in that the mobile terminal 2 has a function of calculating a threshold value.

Figure 8:
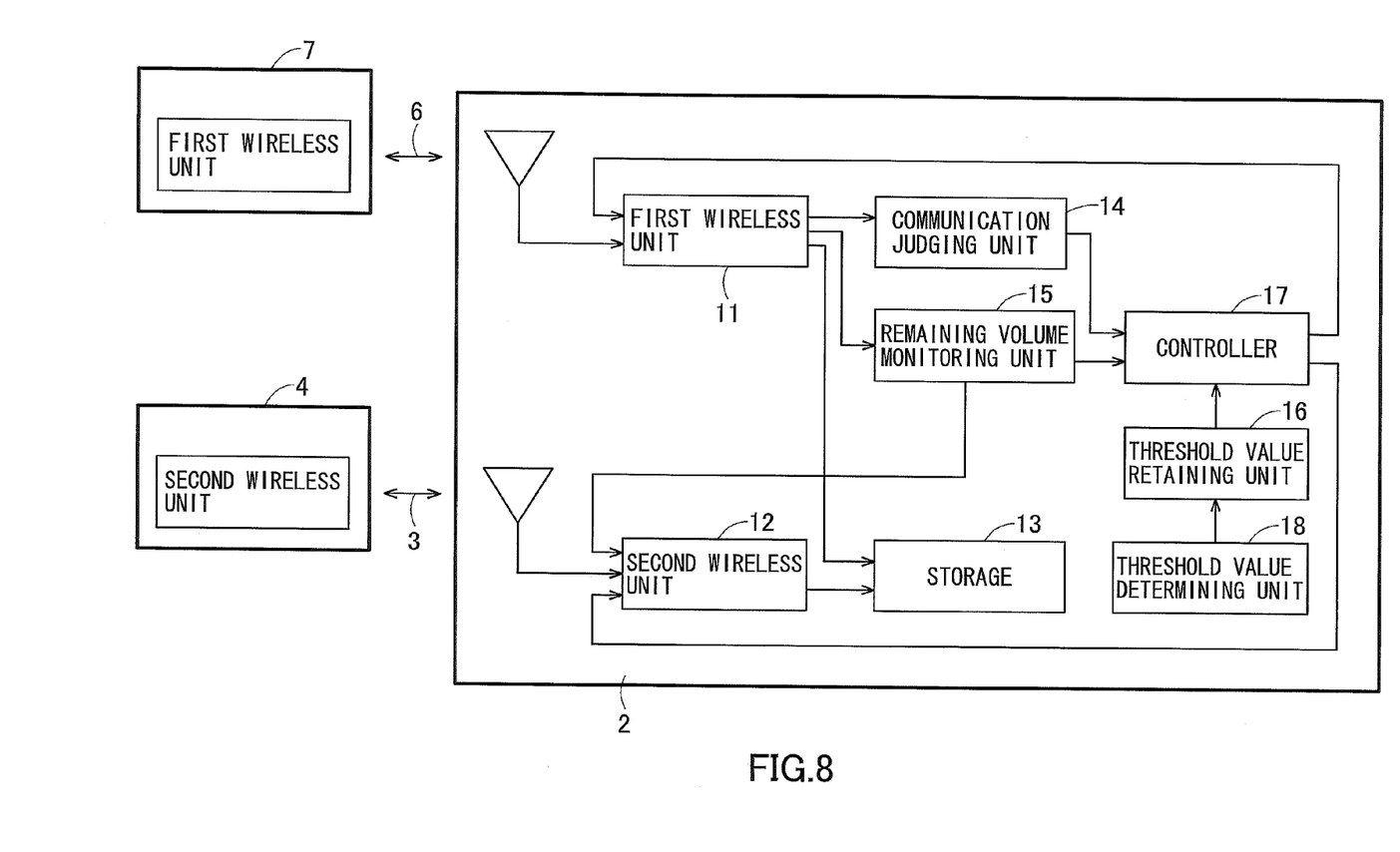
FIG. 8 is a block diagram showing the internal structure of the mobile terminal 2 according to a fourth embodiment.

FIG. 8 is a block diagram showing the internal structure of the mobile terminal 2 according to the fourth embodiment. Compared to FIG. 2, the mobile terminal 2 of FIG. 8 further has a threshold value determining unit 18, and the threshold value determined by this threshold value determining unit 18 is retained by the threshold value retaining unit 16.

The threshold value determining unit 18 determines a threshold value based on input parameters such as a characteristic value determined depending on the data to be downloaded, a value concerning the traffic of the private network 6 and the public network 3, and a value determined depending on the wireless system of the second wireless unit 12. The characteristic value determined depending on data is, e.g., a data distribution time. In a more concrete example, the threshold value is set larger than a normal value if the distribution time is within one week. As the distribution date is new, there is a high possibility that the distributor has an intention for distributing the data to a larger number of people. Accordingly, by setting a larger threshold value to increase the frequency of utilizing the public network 3, the possibility that the data is completely downloaded can be increased.

Further, the value concerning traffic is, e.g., a time value during download. If the time zone is midnight, it is determined that traffic is light, and the time value is set larger than the ordinary threshold value in order to increase the frequency of utilizing the public network 3.

Figure 9:
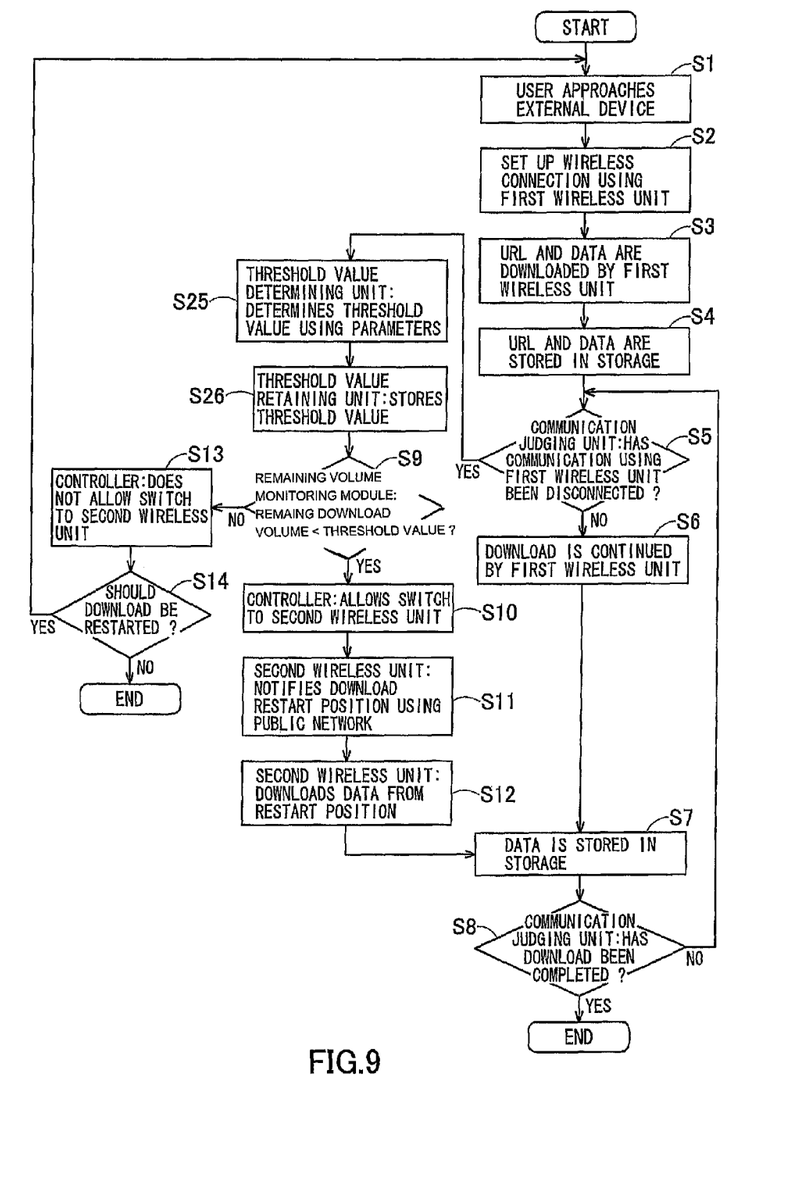
FIG. 9 is a flow chart showing the processing operation performed by the mobile terminal 2 of FIG. 8.

FIG. 9 is a flow chart showing the processing operation performed by the mobile terminal 2 of FIG. 8. In FIG. 9, the same processing steps as those in FIG. 3 are given the same symbols. In FIG. 9, when communication between the first wireless unit 11 of the mobile terminal 2 and the external device 7 is disconnected at Step S5, the threshold value determining unit 18 determines a threshold value using the above input parameters (Step S25). The determined threshold value is retained by the threshold value retaining unit 16 (Step S26). After that, Step S9 and subsequent steps are performed.

As stated above, in the fourth embodiment, since the threshold value is determined by the mobile terminal 2 itself, an optimum threshold value can be set considering such parameters as the type of data to be downloaded, the traffic of the private network 6 and the public network 3, and the wireless system of the second wireless unit 12. Accordingly, it is possible to prevent the traffic of the public network 3 from being excessively increased while preventing a fail in downloading data as much as possible.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device comprising:
   a first wireless module which receives data;
   a second wireless module which is capable of receiving data and which has a longer communication distance than the first wireless module, wherein a communication speed of the first wireless module is faster than a communication speed of the second wireless module;
   a storage which stores data received by the first wireless module or by the second wireless module;
   a communication judging module which judges whether the first wireless module is continuing to receive the data, or has disconnected communication;
   a threshold value retaining module which retains a threshold value used to judge whether or not to permit a switch of the communication from the first wireless module to the second wireless module;
   a remaining volume monitoring module which judges, in response to a judgment by the communication judging module that the first wireless module has disconnected the communication, whether a volume of remaining unreceived data to be incorporated into the data received by the first wireless module before disconnection of the communication is smaller than the threshold value retained by the threshold value retaining module;
   a controller which switches the communication from the first wireless module to the second wireless module, the second wireless module receiving the remaining unreceived data, in response to a judgment by the remaining volume monitoring module that the volume of remaining unreceived data is smaller than the threshold value; and
   a display;
   wherein when the remaining volume monitoring module judges that the volume of remaining unreceived data is not smaller than the threshold value, the controller judges whether or not it is possible to continue the communication by the first wireless module after disconnection, and
   wherein the controller has a movement instructing module which instructs, when the controller judges that it is not possible to continue the communication by the first wireless module, a user to move and enter a range where the communication by the first wireless module is possible by displaying an indicator on the display.

2. The wireless communication device of claim 1, further comprising:
   a notifier module which notifies, when the volume of remaining unreceived data is judged to be smaller than the threshold value by the remaining volume monitoring module, a data provider device through the second wireless module of a leading position of the remaining unreceived data,
   wherein after the notifier module notifies the data provider device of the leading position of the remaining unreceived data, the controller switches the communication from the first wireless module to the second wireless module and the second wireless module starts receiving the remaining unreceived data.

3. The wireless communication device of claim 1, wherein when the remaining volume monitoring module judges that the volume of remaining unreceived data is not smaller than the threshold value, and if the controller judges that the communication by the first wireless module is possible after disconnection, the first wireless module restarts receiving the remaining unreceived data.

4. The wireless communication device of claim 1, wherein the threshold value retained by the threshold value retaining module is set depending on a type of data to be received.

5. The wireless communication device of claim 1, wherein the threshold value retained by the threshold value retaining module is set depending on communication traffic between the second wireless module and a data provider device.

6. The wireless communication device of claim 1, wherein the threshold value retained by the threshold value retaining module is set depending on a wireless system of the second wireless module.

7. The wireless communication device of claim 1,
   wherein the first wireless module communicates with a data provider device through a proximity high-speed wireless communication network, and
   wherein the threshold value retaining module acquires and retains the threshold value from the data provider device through the proximity high-speed wireless communication network using the first wireless module.

8. The wireless communication device of claim 1,
   wherein the second wireless module communicates with a base station serving as a data provider device through a public wireless link, and
   wherein the threshold value retaining module acquires and retains the threshold value from the base station through the public wireless link using the second wireless module.

9. The wireless communication device of claim 1, further comprising:
a threshold value determining module which determines the threshold value based on at least one of a type of data to be received, traffic of a wireless link used to receive data, and a wireless system of the second wireless module,
wherein the threshold value retaining module retains the threshold value determined by the threshold value determining module.

10. The wireless communication device of claim 1, further comprising at least one antenna.

11. A wireless communication method comprising:
storing, in a storage, data received by a first wireless module which receives data or by a second wireless module which is capable of receiving data and which has a longer communication distance than the first wireless module, wherein a communication speed of the first wireless module is faster than a communication speed of the second wireless module;
judging whether the first wireless module is continuing to receive the data, or has disconnected communication;
retaining, in a threshold value retaining module, a threshold value used to judge whether or not to permit a switch of the communication from the first wireless module to the second wireless module;
judging, in response to a judgment that the first wireless module has disconnected the communication, whether a volume of remaining unreceived data to be incorporated into the data received by the first wireless module before disconnection of the communication is smaller than the threshold value retained by the threshold value retaining module; and
switching, in response to a judgment that the volume of remaining unreceived data is smaller than the threshold value, the communication from the first wireless module to the second wireless module, the second wireless module receiving the remaining unreceived data;
when it is judged that the volume of remaining unreceived data is not smaller than the threshold value, judging whether or not it is possible to continue the communication by the first wireless module after disconnection, and
when it is judged that it is not possible to continue the communication by the first wireless module, instructing a user to move and enter a range where the communication by the first wireless module is possible by displaying an indicator on a display.

12. The method of claim 11, further comprising:
notifying, when the volume of remaining unreceived data is judged to be smaller than the threshold value, a data provider device through the second wireless module of a leading position of the remaining unreceived data,
wherein after the data provider device is notified of the leading position of the unreceived data, the communication is switched from the first wireless module to the second wireless module and the second wireless module starts receiving the remaining unreceived data.

13. The method of claim 11, wherein when it is judged that the volume of remaining unreceived data is not smaller than the threshold value, and if it is judged that the communication by the first wireless module is possible after disconnection, the first wireless module restarts receiving the remaining unreceived data.

14. The method of claim 11, wherein the retained threshold value is set depending on a type of data to be received.

15. The method of claim 11, wherein the retained threshold value is set depending on communication traffic between the second wireless module and a data provider device.

16. The method of claim 11, wherein the retained threshold value is set depending on a wireless system of the second wireless module.

17. The method of claim 11,
wherein the first wireless module communicates with a data provider device through a proximity high-speed wireless communication network, and
wherein the threshold value retaining module acquires and retains the threshold value from the data provider device through the proximity high-speed wireless communication network using the first wireless module.

18. The method of claim 11,
wherein the second wireless module communicates with a base station serving as a data provider device through a public wireless link, and
wherein the threshold value is acquired and retained from the base station through the public wireless link using the second wireless module.

* * * * *